July 15, 1969 H. J. FRANK 3,456,124

INDUCTIVE LOAD CONTROLLER

Filed July 5, 1966

INVENTOR

HARRY J. FRANK

BY

Andrus & Starke

Attorneys

United States Patent Office 3,456,124

Patented July 15, 1969

3,456,124

INDUCTIVE LOAD CONTROLLER

Harry J. Frank, Box 357C, Rte. 1, Cedarburg, Wis. 53012

Filed July 5, 1966, Ser. No. 562,560
Int. Cl. H01h 7/14
U.S. Cl. 307—141 10 Claims

ABSTRACT OF THE DISCLOSURE

This disclosure relates to operating a pair of D.C. solenoids, one controlling a tape feed and the other controlling a severing knife. Each solenoid is series connected with a diode and a silicon controlled rectifier to a direct current source. A capacitor is connected across the diode and the inductive load. Individual capacitor timing circuits are connected to a common input amplifier responsive to the position of a board to be taped. An electrical clamping means clamps the timing capacitors to an initial level. One timing capacitor is coupled to the tape feed circuit and a second to the knife circuit.

This invention relates to an inductive load controller and particularly to an on-off control for a load such as a direct current motor, solenoid or other direct current electromagnetic device.

Direct current inductive loads such as motors, power solenoids and the like are often required to be provided with on-off control.

Silicon controlled rectifiers have been widely employed as switching devices, normally being turned on from a pulse circuit. Although continuous gate current controls have been generally suggested they have not been generally employed in commercial devices because of the limitations in connection with the turn-off control problems.

The present invention is particularly directed to employment of a silicon controlled rectifier or the like in series with the inductive load to provide an on-off type control. Generally, in accordance with the present invention, the main power circuit for the load is from a full wave alternating current rectifier providing a suitable full wave direct current output. The output however in contrast to the usual practice is not filtered in order to maintain a selected ripple voltage across the load circuit. A capacitor is connected in parallel with the inductive load and a blocking diode to provide a capacitive-inductive network.

In the absence of gate current, no current flows through the load circuit as a result of the blocking action of the silicon controlled rectifier. In the presence of a gate current, the silicon controlled rectifier maintains conduction through the load. As soon as the gate current is removed however, the characteristic of the capacitive-inductive circuit is such as to immediately prevent further conduction of the silicon controlled rectifier and thus to open the circuit.

The present invention may be employed to control any direct current electromagnetic means and has been satisfactorily employed with direct current motors and automatic timed operation of D.C. solenoids and the like. For example, a highly satisfactory system has been devised to control the automatic delivering and severing of tape to the seam of a folded cardboard member. In this application, a pair of D.C. solenoids was provided, one controlling a tape feed and the other controlling a severing knife. Individual timing circuits having a common input controlled the gate current to the tape feed means and the knife. The timing circuits generally employ a common input amplifier responsive to the position of the board to be taped; for example, through a photoelectric system. The output of the amplifier is connected to control the two timing circuits which employed timing capacitors to control the sequence of operation. A clamping means clamped the timing capacitors to a set or initial level. One timing capacitor is coupled to the tape feed circuit and a second to the knife circuit. The latter provides a time delay of a selected period after which the second timing circuit is triggered and applies a timed signal to the knife operator to energize the solenoid and positively sever the tape.

The present invention thus provides a very simple, low current means for turning on and off of the power to a direct current electromagnetic load.

The drawing furnished herewith illustrates preferred constructions of the present invention in which the above advantages and features are clearly described and shown as well as others which will be clear from the following description of the drawing.

Figures 1, 2:
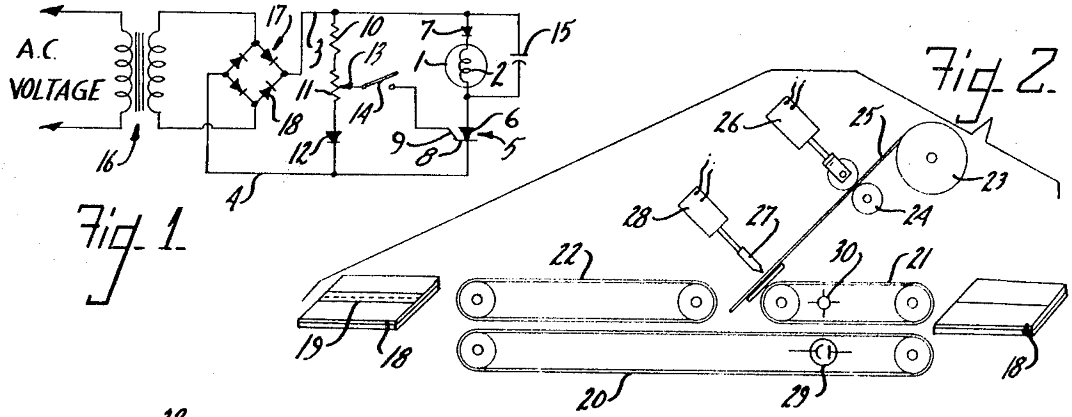
FIG. 1 is a schematic circuit diagram of the present invention applied to a direct current motor.
FIG. 2 is a tape applicator employing the present invention.

Referring to the drawing and particularly to FIG. 1, a direct current motor 1 is diagrammatically shown having a motor winding 2 for controlling the energization and thereby operation of the motor. The winding 2 is connected to suitable incoming D.C. power lines 3 and 4 in series with a silicon controlled rectifier 5.

The rectifier 5 is a well known type unit having an anode 6 which is connected in series with the winding 2 and a properly polarized diode 7 to the positive line 3. The cathode 8 is connected to the negative line 4. Normally, the rectifier 5 functions to block the current through the path of the winding unless a gate signal is applied to a gate 9 of the rectifier 5.

In the illustrated embodiment of the invention, the gate signal is derived from a voltage divider network including a fixed resistor 10 and a variable resistor or potentiometer 11 connected in series with each other and with an appropriately polarized steering diode 12 across the lines 3 and 4. The tap 13 of potentiometer 11 is connected in series with an on-off switch 14 to the gate 9. Thus, whenever the switch 14 is closed, the voltage appearing at the tap 13 is applied to the gate 9 to provide a gate current turning on the silicon controlled rectifier 5 and establishing conduction therethrough.

Normally, in the usual practical application of silicon controlled rectifiers, the current flow through the circuit after firing is made independent of the removal of the gate current. In the present invention, the current through the silicon controlled rectifier 5 requires presence of gate current such that the motor 1 stops upon removal of the gate current. This action particularly results in the present invention as a result of the following circuit connections.

A capacitor 15 is connected in parallel with the motor winding 2 and the diode 7. Further, the direct current power appearing between lines 3 and 4 is derived from a transformer-rectifier unit including a suitable transformer 16 for reducing the incoming voltage to a suitable level. A full wave bridge rectifier 17 is connected across the output side of the transformer 16 and to the lines 3 and 4. The bridge is any well known device shown schematically as including the four similar diodes in the closed loop with a pair of junctions connected to the A.C. transformer 16 and the other terminals connected to lines 3 and 4 to provide a full wave power to the lines 3 and 4. Of particular significance and importance in connection with the present invention is the fact that the bridge circuit is connected directly to the lines 3 and 4 and to the motor 2 without any filtering of the output. Consequently, the output voltage includes a small ripple component during conduction. Although the inductance of winding 2 tends to smooth the output current, a very appreciable and noticeable ripple is maintained. It is not such as to however interfere with the entirely proper and very satisfactory operation of the D.C. motor.

In the present invention, the current flows through the load circuit including the inductive motor winding 2 and in parallel through the capacitor 15 as long as gate current is maintained. As soon as the gate current is removed, the ripple voltage acts through the inductive-capacitive network to rapidly turn off the silicon controlled rectifier and terminate conduction therethrough. The capacitor 15 is connected in shunt with the inductive load to null the voltage supplied as a result of the self-induced field in the highly inductive field winding 2 of the motor 1 to permit shutoff of the silicon controlled rectifier. Generally, it has been found that to obtain satisfactory results the capacitive reactance should be essentially equal to the inductive reactance of the load winding 2.

The present invention thus provides a very simple and reliable means for turning on and off of the power through an inductive load wherein the load itself functions during the turn-off operation. The on-off switch 14 need only handle current in the order of milliamps and consequently the switch will have an exceptionally long life.

Figure 3:
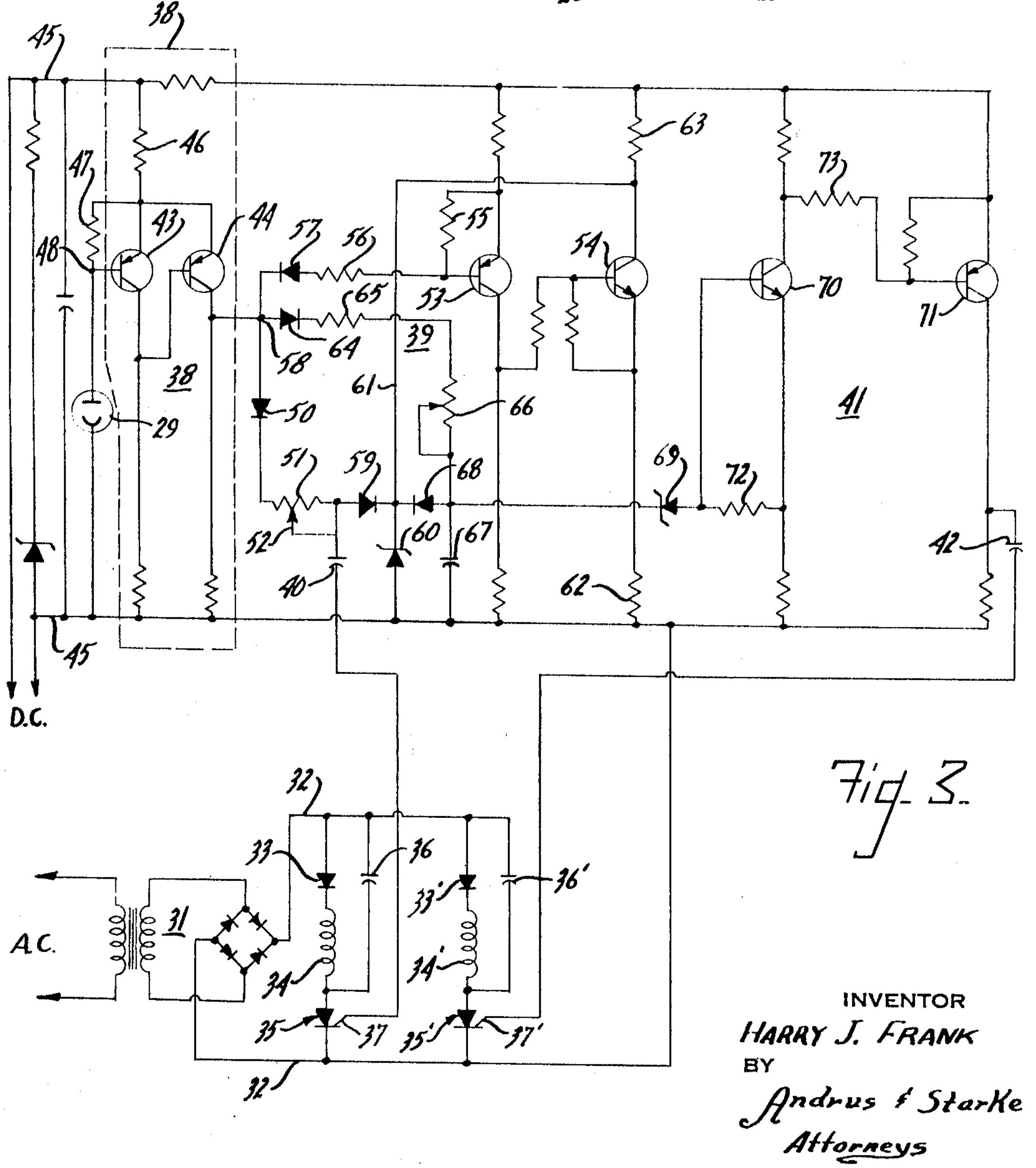
FIG. 3 is a schematic circuit diagram showing a special timing circuit connected to control the electromagnetic actuators of the tape applicator in accordance with the teaching of the present invention.

FIGS. 2 and 3 illustrate the present invention as applied to another electromagnetic control, particularly a solenoid operated tape applicator. The apparatus is diagrammatically shown in FIG. 2. Generally, a flat folded member 18 of cardboard or the like is provided with a seam along which a strip of tape 19 is to be applied. The folded members 18 are fed into and between a transfer support belt 20 having an overlying infeed drive belt 21 at one end of the applicator. A discharge and pressure belt 22 is spaced slightly from the infeed drive belt 21 in overlying relation to the belt 20. A tape supply 23 is mounted at the spacing of the belts 21 and 22. Solenoid operated rotating feed wheels 24 selectively grip the tape 25 for feeding of the tape toward the pressure unit 22. One of the feed wheels 24 is connected to a solenoid 26 for moving into clamping and feeding engagement with the tape and for release therefrom to prevent movement of the tape. Thus, when the solenoid 26 is energized, the wheels 24 will firmly clamp the tape 25 between them and drive the tape downwardly in particular over the seam of member 18 as it moves between belts 20 and 22. The tape 25 passes a knife 27 mounted forwardly of the feed wheels 24. The knife 27 is adapted to sever the tape 25 to apply the proper length of tape 19 over the seam. A solenoid 28 is coupled to knife 27 and selectively actuated a predetermined period of time after actuation of the feed wheels 24 to sever the strip 19.

The solenoids 26 and 28 are selectively energized for proper timed periods by a circuit constructed in accordance with this invention and in response to the movement of the folded member 18.

In the illustrated embodiment of the invention, a photoelectric cell 29 is mounted to one side of the path of the member 18 adjacent the discharge end of the drive belt 21. A light source 30 is mounted to the opposite side thereof. In the absence of a positioning of a member therebetween, the cell 29 is energized by source 30 and provides an output signal preventing operation of solenoid operators 26 and 28. When the member breaks the light connection between the cells 29 and source 30, the output of the control unit is such as to cause sequential and timed operation of the solenoid operators 26 and 28, as presently described.

The photoelectric cell 29 is connected to a solenoid control unit having an output which includes a timing means for providing proper sequential and timed operation of the solenoid operators 26 and 28 to feed the tape over the seam of the folded member 18 and to sever the tape at the proper instance to provide the desired length of tape in accordance with the length of the seam.

A particularly satisfactory control circuit employing the teachings of the present invention is shown in FIG. 3 in which the solenoids 26 and 28 are connected in an energizing circuit similar to that described for the motor winding of FIG. 1.

As shown in FIG. 3, a transformer and full wave rectifier assembly provides a nonfiltered direct current across positive and negative power line 32 as in FIG. 1. A diode 33 is connected in series with solenoid winding 34 of the feed solenoid 26 and the main terminal elements of a silicon controlled rectifier 35. A capacitor 36 is connected in parallel with the winding 34 and the diode 33. As in the previous embodiment of the invention, application of current to the gate 37 of rectifier 35 results in conduction of the nonfiltered D.C. power through the inductive load winding 34 and in parallel through the capacitor 36. As long as the gate current is maintained full conduction is maintained through the winding 34. Removal of gate current however causes essentially immediate discontinuance of energization of the solenoid winding 34 in the same manner as previously described with the operation of the motor.

The knife solenoid winding 34' is connected in an identical circuit for similar operation and the corresponding elements of the two circuits are identified by primed numbers corresponding to the numbering of the feed solenoid winding circuit for simplicity and clarity of subsequent explanation and description.

Both solenoid windings 34 and 34' are controlled by timing circuits responsive to the output of the cell 29. Generally, the illustrated embodiment of the invention includes a common two stage input switching amplifier 38 having the cell 29 connected in the input circuit thereof. A tape feed control circuit 39 is connected to provide a timed current through a timing capacitor 40 to the gate 37 of the silicon controlled rectifier 35. A knife control circuit 41 is connected to the output of the amplifier 38 to provide a timed current through a timing capacitor 42 to the gate 37' of silicon controlled rectifier 35'.

The switching amplifier 38 is shown as a direct coupled unit having a pair of PNP transistors 43 and 44 connected in common emitter configuration to a set of regulated bias power lines 45 and having a common emitter resistor 46. The transistors 43 and 44 are schematically shown and specific elements are not hereinafter numbered. The transistor 43 constitutes the input transistor with the photoelectric cell 29 connected in series with a bias resistor 47 and common emitter resistor 46 across the regulated bias power lines 45. The junction 48 of the resistor 47 and the cell 29 is connected directly to the base of the transistor 43. The base of transistor 44 is connected to the collector of transistor 43.

The transistor 43 is biased to conduct whenever sufficient light impinges on cell 29 from source 30. Thus, transistor 43 conducts in the absence of a member 18 interposed between the cell 29 and the source 30. As a result, the base and the emitter of transistor 44 are at essentially the same voltage and the transistor 44 is cut off.

When a member 18 is interposed between the source 30 and the cell 29, however, the bias on the transistor 43 drops. The transistor 43 rapidly turns off and the transistor 44 rapidly turns on through the common emitter circuit connection. The output of the amplifier 38 is taken from the collector of the transistor 44 and simultaneously applied to the tape feed control circuit 39 and the knife control circuit 41.

The tape feed control circuit 39 includes a diode 50 in series with a potentiometer 51 connected between the output of the amplifier and the capacitor 40. The potentiometer 51 is a balance control and includes a slider or tap 52 connected to the negative side of the potentiometer to vary the portion of the potentiometer connected in circuit. Thus, whenever the transistor 44 conducts, it provides a signal through the diode 50, potentiometer 51 and capacitor 40 to the gate 37. The current will flow for a timed period determined by the setting of potentiometer 51 and the value of the capacitor 40. As the capacitor 40 approaches its fully charged state, the gate current decreases to a level which cannot trigger the silicon controlled rectifier and the nonfiltered D.C. power supply 31 in combination with the parallel conductive load winding 34, diode 33 and capacitor 36 cause rapid turn-off of the silicon controlled rectifier.

To insure proper timing of the circuit, the capacitor 40 is normally clamped to a selected D.C. negative voltage as follows. A pair of transistors 53 and 54 of the complementary type is interconnected to provide a negative clamping circuit. The transistor 53 is shown as the usual PNP type and the transistor 54 is a conventional NPN variety for purposes of illustration.

The transistors are standard type units and have their emitters and collectors connected to the appropriate side of D.C. power lines 45 with appropriate impedances in the leads. The collector of transistor 53 is connected to the base of transistor 54 such that transistor 54 only conducts when transistor 53 conducts. An emitter to collector resistor 55 is interconnected between the base and emitter of the transistor 53. A series base resistor 56 in series with a diode 57 is connected to the junction 58 of the diode 50 and the output of amplifier 38. A steering diode 59 further interconnects the capacitor 40 to the positive terminal of a Zener diode 60, the opposite terminal of which is connected to the negative side of lines 45. Additionally, a lead 61 directly interconnects the common connection of diode 59 and the Zener diode 60 to the collector of the transistor 54. The emitter of transistor 54 is connected to the negative side of lines 45 through a small resistor 62 and its collector to the positive side of lines 45 through a relatively large resistor 63 such that when transistor 54 conducts its collector is essentially at negative line potential. This in essence clamps the capacitor 40 to the corresponding negative potential level from which the charging and timing action begins.

The operation may thus be briefly summarized with the amplifier initially turned off; i.e., with a member 18 removed from the path of light source 30 to cell 29. Transistor 43 is conducting and transistor 44 is nonconducting. Consequently, no voltage appears at the input of the amplifier. As a result, the capacitor 40 is clamped to the negative voltage level. When the member 18 is introduced between the light source 30 and the cell 29, transistor 43 is rapidly cut off and transistor 44 turned on. As a result, a positive output signal appears from the amplifier 38 which is applied simultaneously to the anode side of diode 50 and to the cathode side of the diode 57. The positive signal on the diode 57 back biases the diode causing the transistor 53 and consequently transistor 54 to turn off. This removes the negative clamp from the timing capacitor 40.

Current now flows from the amplifier 38 through the diode 50, balance adjusting potentiometer 51, timing capacitor 40, and gate 37 and back to the common negative side via the cathode of the silicon controlled rectifier 35. The silicon controlled rectifier 37 conducts and remains conducting for a period of time determined by the size of the capacitor 40. When the charge of the capacitor 40 reaches a selected level, the gate current is insufficient to maintain the silicon controlled rectifier 37 conducting and it reverts to the blocking state as a result of the nonfiltered D.C. of supply 31 in combination with the paralleled capacitor 36 and inductive solenoid winding 34 in series with diode 33. This provides a very accurately controlled timed energization of the solenoid winding 34 and actuation of the feed solenoid 26 to control the movement of the tape 25 and therefore the length of tape strip 19 in accordance with the seam length.

Simultaneously, with the operation of the feed solenoid circuit, the knife control circuit 41 is actuated to provide for delayed and timed energization of the gate 37' through the capacitor 42 as follows.

The output of the amplifier 38 is connected via a diode 64, a fixed resistor 65 and a potentiometer 66 to charge a timing capacitor 67. A steering diode 68 connects the junction of the potentiometer 66 and the capacitor 67 to lead 61 which is tied to the collector of the clamping transistor 54.

When an output is established from the amplifier 38 through the timing capacitor 40 previously described for actuating the solenoid 26, current is simultaneously applied through the above series described circuit to charge capacitor 67 which was also previously clamped to the negative reference level. The negative clamp is removed as previously described as a result of the back biasing signal applied to the diode 57 connected to the base of the transistor 53.

When the charge on the capacitor 67 reaches a selected level, it is effective to trigger a circuit for establishing current flow through capacitor 42 and therefore gate 37'. The top side of the capacitor 67 is connected via a Zener diode 69 to the knife control circuit 41. Generally, the circuit 41 includes a pair of complementary transistors 70 and 71 interconnected through a suitable bias circuit to the regulated power D.C. lines 45. Transistor 70 is shown as an NPN transistor and transistor 71 is shown as a PNP transistor. A bias resistor 72 is connected across the base to emitter circuit of the transistor 70 and the base is also connected to the Zener diode 69. When the capacitor 67 reaches the breakdown level of the Zener diode 69, a turn-on signal is applied to the base of transistor 70. The conduction through the transistor 70 in turn applies a turn-on signal through a coupling resistor 73 to the base of the transistor 71. The timing capacitor 42 is connected to the collector of the transistor 71 such that a charging current is established through the capacitor 42 and the gate 37' of the silicon controlled rectifier 35' when transistor 71 conducts.

This will provide for timed energization of the inductive solenoid winding 34' of the knife solenoid 28. Knife 27 may of course be rapidly operated and gate current supplied to gate 37' for a relatively short period. As soon as gate current flow terminates, the ripple voltage of supply 31 in combination with the parallel capacitor 36' and winding 34' in series with diode 33' provides for rapid turn-off of the silicon controlled rectifier and return thereof to the blocking state. In the knife circuit 41, capacitor 67 provides for a time delay before energization of the solenoid 28 and the capacitor 42 provides for a timed energization of the solenoid to provide the necessary sequential operation.

In summary, the embodiment of the invention illustrated in FIGS. 2 and 3 will function as follows. The members 18 to be taped are sequentially fed into the apparatus by the feed belt 21 with successive members spaced from each other. As a member 18 moves through the apparatus, it interrupts the light path from the source 30 to the photocell 29, resulting in actuation of the switching amplifier 38 to provide an output signal to the timing circuits 39 and 41. The signal first releases the negative clamp applied to the timing capacitors 40 and 67. Current is directly supplied through the timing capacitor 40 to the gate 37 of silicon controlled rectifier 35 for energizing the solenoid winding 34 of the feed solenoid 26. Consequently, the wheels 24 clamp the tape 25 and feed it into overlying relation upon the seam.

Simultaneously, with the feed of the tape 25, the capacitor 67 is being charged. After a selected period, it rises to a level to fire the Zener diode 69 to bias the transistors 70 and 71 to conduct. As a result, the capacitor 42 transmits a timed current to the gate 37' of the silicon controlled rectifier 35' with the resultant energization of the knife solenoid 28. The knife 27 is thus actuated to sever the tape 25 from the tape source.

At the end of the appropriate timing periods, the gate currents to the gates 37 and 37' of silicon controlled rectifiers 35 and 35' terminate to turn off the rectifiers as heretofore described. When the trailing edge of member 18 passes the source 30, the photocell 29 is again energized to turn on transistor 43 and thereby turn off transistor 44 of the amplifier 38. Consequently, the positive signal is removed from the timing circuits and the steering diode 57 of the clamping circuit is no longer reverse biased. Consequently, the transistors 53 and 54 imediately turn on and connect the capacitors 40 and 67 to a negative voltage. The charged capacitors 40 and 67 rapidly discharge through the circuit of the diodes 57 and 68. The discharge time is very short and consequently permits very rapid cycling of the circuit such that only a very minimum space need be provided between the sequentially fed members 18.

The present invention thus provides a very simple, reliable and inexpensive means for operating inductive direct current load circuits in a very reliable and satisfactory manner.

Various modes of carrying out the invention are contemplated as being within the scope of the following claims particularly pointing out and distinctly claiming the subject matter which is regarded as the invention.

I claim:

1. An on-off controller for a direct current inductive load,

- a blocking rectifier means including a pair of main elements and a firing element, said rectifier means being conductive only when a selected polarity is applied across the main elements and a selected gate current is applied to the firing element,
- a unidirectional conducting means,
- a load circuit including said rectifier means connected in series with a load connecting means for connection to opposite sides of the inductive load and said unidirectional conducting means,
- a capacitive impedance connected in parallel with the unidirectional conducting means and the load connecting means, and
- means to supply a pulsating unidirectional voltage across the load circuit.

2. An on-off controller for an inductive direct current load, comprising

- a load branch circuit including a controlled rectifier connected in series with load connecting means for connection to opposite sides of the inductive load and a unidirectional conducting means, said rectifier having a firing element,
- a capacitive element connected in parallel with said connecting means and said unidirectional conducting means and in series with said rectifier,
- a direct current power supply having a ripple component connected across said load branch circuit to impress said voltage including said ripple component upon the inductive load, and
- switch means to control application of power to said gate element.

3. The on-off controller of claim 2 wherein said controlled rectifier is a silicon controlled rectifier.

4. The controller of claim 2 wherein the reactance of the capacitive means and inductive load are essentially equal.

5. The controller of claim 2 wherein the power supply includes an alternating current input means and a full wave rectifier to produce an unfiltered direct current across the load branch circuit.

6. The controller of claim 2 for operating a direct current motor having an operating winding constituting said inductive load, and including a voltage dividing network connected to the power supply, said switch means being connected to the firing element and the network to selectively fire the rectifier and thereby control energization of the motor.

7. The on-off controller of claim 2 for actuating a feeding and cutting apparatus, including

- an electromagnetic feed control having a winding connected to the load connecting means,
- an electromagnetic cut control having a winding,
- a second load branch circuit corresponding to said first branch circuit and having the winding of the cut control connected to the load connecting means thereof, and
- timing means to sequentially supply current to said firing elements for selected time periods to actuate the controls in timed sequence.

8. The controller of claim 7 wherein said timing means includes,

- a switching amplifier,
- a first timing capacitor connected in series with the amplifier and the firing element in the feed control load branch circuit,
- a second timing capacitor connected in series with the amplifier,
- reference means connected to the amplifier and to the timing capacitors to establish a reference voltage level and responsive to switching of the amplifier to the second position to disconnect the capacitor from the common reference supply,
- a control amplifier having an input means connected to the second timing capacitor, and
- a third timing capacitor connected in series with the firing element of the control rectifier in the cut control load branch circuit and the control amplifier.

9. The controller of claim 8 wherein said reference means includes a solid state amplifying means connected to clamp the capacitors to a selected reference and having an input connected to the switching amplifier for unclamping of said capacitors.

10. The controller of claim 8 having variable resistor means connected in circuit with said first and second timing capacitors to control the period of supplying current to said firing elements.

References Cited

UNITED STATES PATENTS

| | | | |
|---|---|---|---|
| 3,213,287 | 10/1965 | King. | |
| 3,299,288 | 1/1967 | McDowell et al. | 307—252 X |
| 3,310,714 | 3/1967 | Gargani. | |
| 3,339,136 | 8/1967 | Rasor et al. | |
| 3,345,546 | 10/1967 | Beltramo | 317—148.5 X |

ROBERT K. SCHAEFFER, Primary Examiner

T. B. JOIKE, Assistant Examiner

U.S. Cl. X.R.

317—148.5